United States Patent [19]
Johnson et al.

[11] Patent Number: 5,721,543
[45] Date of Patent: Feb. 24, 1998

[54] SYSTEM AND METHOD FOR MODELING DISCRETE DATA SEQUENCES

[75] Inventors: Steven Andrew Johnson, Norcross; Li-Zhe Tan, Doraville; Sing-Wai Wu, Norcross, all of Ga.

[73] Assignee: Iterated Systems, Inc., Atlanta, Ga.

[21] Appl. No.: 497,546

[22] Filed: Jun. 30, 1995

[51] Int. Cl.$^6$ ............................. G06T 5/00; G03K 9/36
[52] U.S. Cl. ..................... 341/50; 395/2.31; 382/249; 348/422; 341/51
[58] Field of Search ................... 341/50, 51, 87, 341/106; 395/2.3, 2.31, 2.32, 2.5; 382/253, 249, 239; 348/422, 417, 418

[56] References Cited

U.S. PATENT DOCUMENTS

| | | |
|---|---|---|
| 4,941,193 | 7/1990 | Barnsley et al. |
| 5,065,447 | 11/1991 | Barnsley et al. |
| 5,262,958 | 11/1993 | Chui et al. |
| 5,347,600 | 9/1994 | Barnsley et al. |
| 5,416,856 | 5/1995 | Jacobs et al. ................. 382/232 |

OTHER PUBLICATIONS

Fractal Image Coding Journal Proceedings of the IEEE Oct. 93, Jacquin.

Book Entitled Fractal Image Compression, by Michael F. Barnsley and Lyman P. Hurd, Copyright ©1993 by AK Peters Ltd.

Book Entitled Fractals Everywhere, Second Edition, by Michael F. Barnsley, Copyright ©1993, 1988 by Academic Press, Inc.

Article Entitled "Using Iterated Function Systems to Model Discrete Sequences", by David S. Mazell and Monson H. Hayes, IEEE Transactions on Signal Processing, vol. 40, No. 7, Jul.1992.

Article Entitled: "Fractal Approach to Low Rate Video Coding", by Bernd Hurtgen and Peter Buttgen, Visual Communications and Image Processing 1993, Cambridge, MA, 8–11 Nov. 1993 vol. 2094, pt. 1, Proceedings of the SPIE—The International Society for Optical Engineering, 1993, pp. 120–131.

(List continued on next page.)

*Primary Examiner*—Jeffrey A. Gaffin
*Assistant Examiner*—Peguy JeanPierre
*Attorney, Agent, or Firm*—Morris, Manning & Martin LLP

[57] ABSTRACT

An encoder and decoder system for compressing discrete data sequences is disclosed. The encoder includes a self-affine map generator and a backward adaptive map generator which model source vectors formed from a discrete data sequence. The self-affine map generator uses known modeling techniques to determine map parameters for mapping functions. The mapping functions are evaluated by computing a collage error and the mapping function corresponding to the smallest collage error is selected. The backward adaptive map generator determines map parameters for mapping functions which map vectors previously generated to represent the discrete data sequence to the source vector. A distance measurement is computed for each target vector/mapping function combination and the mapping function corresponding to the smallest distance measurement is selected. A map evaluator determines whether the mapping function generated by the self-affine map generator or the backward adaptive map generator best represents the discrete data sequence. The inventive decoder includes an iterative decoder and a backward decoder. The iterative decoder uses a deterministic or random iteration algorithm to generate a synthesized vector from a mapping function received from an encoder. The backward decoder retrieves a vector from a sample buffer at the decoder which corresponds to the vector used to generate the mapping function. The sample buffer contains previously decoded vectors. The mapping function is applied to the retrieved vector once to generate the synthesized vector representing a source vector at the encoder. The decoder selects the affine decoder or the backward decoder based upon a token from the encoder which identifies the process which generated the mapping function.

36 Claims, 3 Drawing Sheets

OTHER PUBLICATIONS

Article Entitled: "Image Coding Based on Fractal Approximation and Vector Quantization", by Kwon Kim and Rae-Hong Park, IEEE Comput. Soc. Press, pp. 132–136.

Article Entitled: "Fractal–Based Compression of Motion Video Sequences", by Baldine–Brunel Paul and Monson H. Hayes, Proceedings ICIP–94, Proceedings of 1st Image Processing, Austin, TX, 13–16 Nov. 1994, 1994, Los Alamitos, CA, IEEE Comput. Soc. Press, pp. 755–759.

Article Entitled: "Image Compression Using Spatial Prediction", by Ephraim Feig and Heidi Peterson, 1995 International Conference on Acoustics, Speech, and Signal Processing, Conference Proceedings, 1995 International Conference on Acoustics, Speech, and Signal Processing, Detroit, MI, 9–12 May 1995, IEEE, pp. 2339–2342.

SYSTEM AND METHOD FOR MODELING DISCRETE DATA SEQUENCES

FIELD OF THE INVENTION

This invention relates to a data compression, and more particularly, to discrete data compression.

BACKGROUND OF THE INVENTION

Data modelling is an area of study that has attracted an intense interest in the last two decades. Data modelling includes the analysis of a data set to determine a function or function system which may be used to represent the data set with fewer elements than contained in the data set. This analysis of data sets to determine a function system which more efficiently represents the data set is also known as data compression. Some common systems of data modelling include polynomial firing, auto-regressive moving average (ARMA), discrete cosine transform (DCT), wavelet theory, fractal transform, and iterated function systems. Known techniques for determining the function systems to represent a data set include geometric and analytical methods. Geometric methods involve the fitting of a representing function system to a function to be represented while analytical methods involve the solution of equation sets to determine the parameters of the representing function.

Two important methods for the fractal modeling of data include linear fractal and piecewise fractal modeling techniques. Fractal modeling is directed to the determination of an iterated function system for a metric space X with a distance function h and a finite set of contractive mappings, $\{w_i: X \rightarrow X \text{ for } i=1,2;\ldots, M\}$. Each map, $w_i$, is usually affine and has contractivity factor $s_i$ where $s_i$ satisfies $h(w_i(x), w_i(y)) \leq s_i \cdot h(x,y)$ for all $x, y \in X$, $0 \leq s_i < 1$. Such systems are well known and are the subject of a number of important writings by Dr. Michael F. Barnsley and others. A fractal transform method for the determination of the mapping functions which may be used to represent data is set forth in U.S. Pat. No. 5,065,447. Variants of this method include linear fractal modeling and piecewise fractal modeling. Linear fractal modeling involves the determination of the maps which map an entire function of a data set to a portion of itself. This method requires segmentation of the function into sections and the determination of the affine map or maps which best map the entire data set to one of the sections. Those maps which best map the data set to a section are encoded and transmitted to a receiver where they are used in an inverse process implementing a deterministic or random iteration algorithm to generate a synthesized vector which represents the original data function.

Because few functions or data sets are capable of being mapped in their entirety to some section of the function, a property known as being self-affine, the piecewise fractal modeling method is more commonly used. This method is comprised of segmenting the data set into sections and then determining mapping functions which map portions of each section to one or more pieces of the section. The portions which are mapped are commonly known as ranges while the pieces to which the ranges are mapped are commonly known as domains. The fractal modeling method, using either geometric or analytical techniques, calculates the map parameters for a mapping function which best maps the ranges to a domain. The maps for all of the ranges are then encoded and transmitted to a receiver. The receiver includes a decompressor which may use a deterministic or random iteration method to generate the synthesized vector corresponding to each transmitted map. The union of the synthesized vectors then provides a representation of the original function. Interpolation techniques used for linear fractal modeling and piecewise fractal modeling of discrete data are disclosed in *Using Iterated Function Systems To Model Discrete Sequences*, IEEE Transactions on Signal Processing, July 1992.

The use of data modeling systems for the compression of discrete data functions is known. Discrete data functions are functions which may be represented by a number of samples typically represented by multi-bit digital values which may be stored in a one dimensional array. While the fractal techniques discussed above and other methods using as DCT and wavelet systems are an improvement over the polynomial and auto-regressive moving average (ARMA) techniques previously used for compressing or representing discrete sequence data, they suffer from a number of limitations.

One of the limitations of fractal methods is the inexactness of the correspondence between the synthesized vectors formed by such methods and the function to be represented, sometimes called a source vector. To select a mapping function which best represents a source vector, a number of mapping functions are evaluated. This evaluation is made by computing a difference between a synthesized vector corresponding to each mapping function and the source vector. However, to generate the synthesized vector requires a decoder that iteratively applies the mapping function to some initial data set until convergence criteria are met. Performing this process for each mapping function to be evaluated requires a significant amount of computer time and resources. To reduce this overhead and still provide a measurement for evaluating the maps, an estimated error is computed for each mapping function. This error is computed by applying each map to the source vector one time and calculating a difference measurement between the resulting synthesized vector and the source vector. This difference represents the smallest error between the two vectors. The upper bound of the error difference or collage error has been shown mathematically to be this smallest error multiplied by $1/_{1-s}$ where s is the interpolated contractivity factor for the mapping function. Thus, the interpolated map having the smallest collage error is selected as the most accurate mapping function. While the collage error is useful, it does not provide an exact measurement of the difference which would provide more information about the mapping function parameters.

Another limitation of fractal modeling techniques is the requirement that the contractivity factor be in the range of −1 to +1. This requirement is necessary so the inverse process of iteratively applying the maps to generate a synthesized vector converges to an attractor. Such a requirement precludes evaluation of mapping functions which may more accurately represent the source vector, but which have contractivity factors outside the permissible range.

What is needed is a discrete data compression method that can efficiently represent functions, both self-affine and not, by more accurately determining a distance measurement and evaluating less restricted mapping functions.

SUMMARY OF THE INVENTION

The above limitations for discrete data compression techniques are overcome by an encoder and decoder constructed in accordance with the principles of the present invention. The encoder of the present invention includes a self-affine map generator for generating a first mapping function which maps a source vector to a portion of itself, a backward adaptive map generator for generating a second mapping function which maps a synthesized vector to the source vector, and a map selector for selecting one of said first and second mapping functions for representing said source vector.

The self-affine map generator of the encoder of the present invention uses known fractal modeling techniques to determine map parameters for the mapping of a source vector to portions of itself using either previously known geometric or analytical fractal techniques. This is done by collecting discrete samples of the incoming discrete data sequence to form a source vector which is divided into domain and range vectors. The self-affine map generator applies known fractal modeling techniques to compute the contraction factors for a number of mapping functions which map the range vectors to the domain vectors. The computed mapping functions are each applied to the source vector to generate comparison vectors which are compared to the source vector to determine a collage error measurement for each computed mapping function. The mapping function corresponding to the smallest collage error is selected as the best mapping function to represent the source vector.

In parallel with the operation of the self-affine map generator, the backward adaptive map generator uses a modified fractal modeling technique to determine the parameters for the mapping functions that map target vectors, which correspond to previously determined mapping functions, to the source vector. The mapping functions are applied once to the corresponding target vector to generate comparison vectors which are compared to the source vector to quantify a distance measurement for each mapping function. The backward adaptive map generator selects the mapping function which corresponds to the smallest distance measurement.

The mapping functions and corresponding measurements selected by the backward adaptive map generator and self-affine map generator are provided to the map selector. The map selector selects the mapping function corresponding to the smallest measurement between the collage error measurement and the distance measurement. If the mapping function from the self-affine map generator is selected, the coefficients for the mapping function are encoded along with a token indicating the mapping function is from the self-affine map generator. The mapping function is also provided to a decoder implementing an iterative algorithm to generate a synthesized vector which represents the source vector. The synthesized vector is stored in the target buffer. If the mapping function from the backward adaptive map generator is selected, the coefficients for the mapping function are encoded along with a token indicating the mapping function is from the backward adaptive map generator and the address of the target vector from the target buffer which was used to determine the mapping function. The data encoded by the map selector is then transmitted to a decoder for use at a remote location. The comparison vector generated by the backward adaptive map generator is then stored in the target buffer as the synthesized vector that represents the source vector.

Preferably, the target buffer of the backward adaptive map generator is sufficiently large so it holds multiple data elements for multiple target vectors. Most preferably, a sliding window is used to retrieve target vectors from the target buffer which are used to determine the parameters for a mapping function corresponding to each target vector. The comparison vector corresponding to each target vector is generated and compared to the source vector to generate a difference measurement for each target vector. Because the comparison vector generated by the one-time application of the mapping function is the same vector as the one generated by the decoder at the remote location to represent the source vector, the difference measurement is an accurate measure of the actual difference of the source vector and its representation—not merely an estimate as the collage error measurement is. Because the difference measurement is more accurate, the backward adaptive map generator more accurately evaluates the correspondence of the generated mapping functions to the source vector.

The backward adaptive map evaluator also evaluates mapping functions which are eliminated by the self-affine map generator. Specifically, known fractal modeling techniques do not evaluate mapping functions with contractive factors outside the range of $-1$ to $+1$. This restriction arises from the inverse process implemented by the decoder which requires that the iterative application of the mapping function converge to an attractor. Because the decoder of the present invention includes a backward decoder which generates an attractor by applying the mapping function only once to a target vector, the mapping function need not converge. Thus, the mapping functions evaluated by the backward adaptive generator may be more general than those of the self-affine map generator.

To increase the probability that a target vector may be mapped very closely to a source vector, the target buffer is comprised of synthesized vectors previously selected by the map selector. Following selection of a mapping function by the map selector, the coefficients of the mapping function are encoded and transmitted to a receiver. The synthesized vector corresponding to the selected mapping function is stored in the target buffer, preferably, in a first in, first out (FIFO) order. Prior to the generation of any synthesized vectors, the target buffer may be initialized with random numbers. As synthesized vectors are generated and stored in the target buffer, the target buffer contents may begin to approximate the incoming source vectors, especially if the source vectors contain much redundant data. Because the sliding window retrieves the discrete data elements comprising the target vectors in the same order the samples comprising the source vectors are generated, the backward adaptive map generator is more likely to generate target vectors which closely correspond to the source vectors.

One advantage of this process is derived from the information stored in the backward adaptive map evaluator. As the process continues and more synthesized vectors are stored in the backward adaptive map generator, the likelihood that a previously synthesized vector is similar to the current source vector increases since most waveforms, especially speech and other aural data, are periodic in nature. Because the source and retrieved target vectors are similar, the mapping function generated by the fractal modeling technique is more likely to yield map coefficients that closely represent the source vector. Because the backward adaptive map evaluator only applies the mapping function to a target vector once to generate synthesized vectors for calculating the difference measurements, the backward adaptive map generator more accurately evaluates the "fit" of the synthesized vectors to the source vector. This increases the probability that map coefficients closely representing the source vector may be found.

The present invention also includes a decoder which selects a decoding sequence based upon the source of the mapping function transmitted to it. The decoder includes a self-affine decoder and a backward decoder. Upon receipt of a transmission from the encoder, the decoder unpacks the encoded coefficients and token to determine whether the mapping function sent by the encoder is from the self-affine map generator or from the backward adaptive map generator. If the mapping function is from the self-affine map generator, the mapping function is provided to the self-affine map generator which initializes a buffer and iteratively applies the mapping function to the buffer until the process converges to an attractor which represents the source vector. This attractor sometimes called a synthesized vector may then be placed in a sample buffer and supplied to a device for conversion to signals which drive speakers or the like at the decoder site. If the mapping function is determined to be from the backward adaptive map generator, the mapping function is provided to the backward decoder which selects a previously synthesized vector from the sample buffer which corresponds to the address of the target vector used to determine the parameters for the mapping function, and apply the mapping function to the selected vector once. The resulting synthesized vector is stored in the sample buffer for use. This decoding process requires fewer computer resources and less computing time than the iterative algorithms used to decode the self-affine mapping functions.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
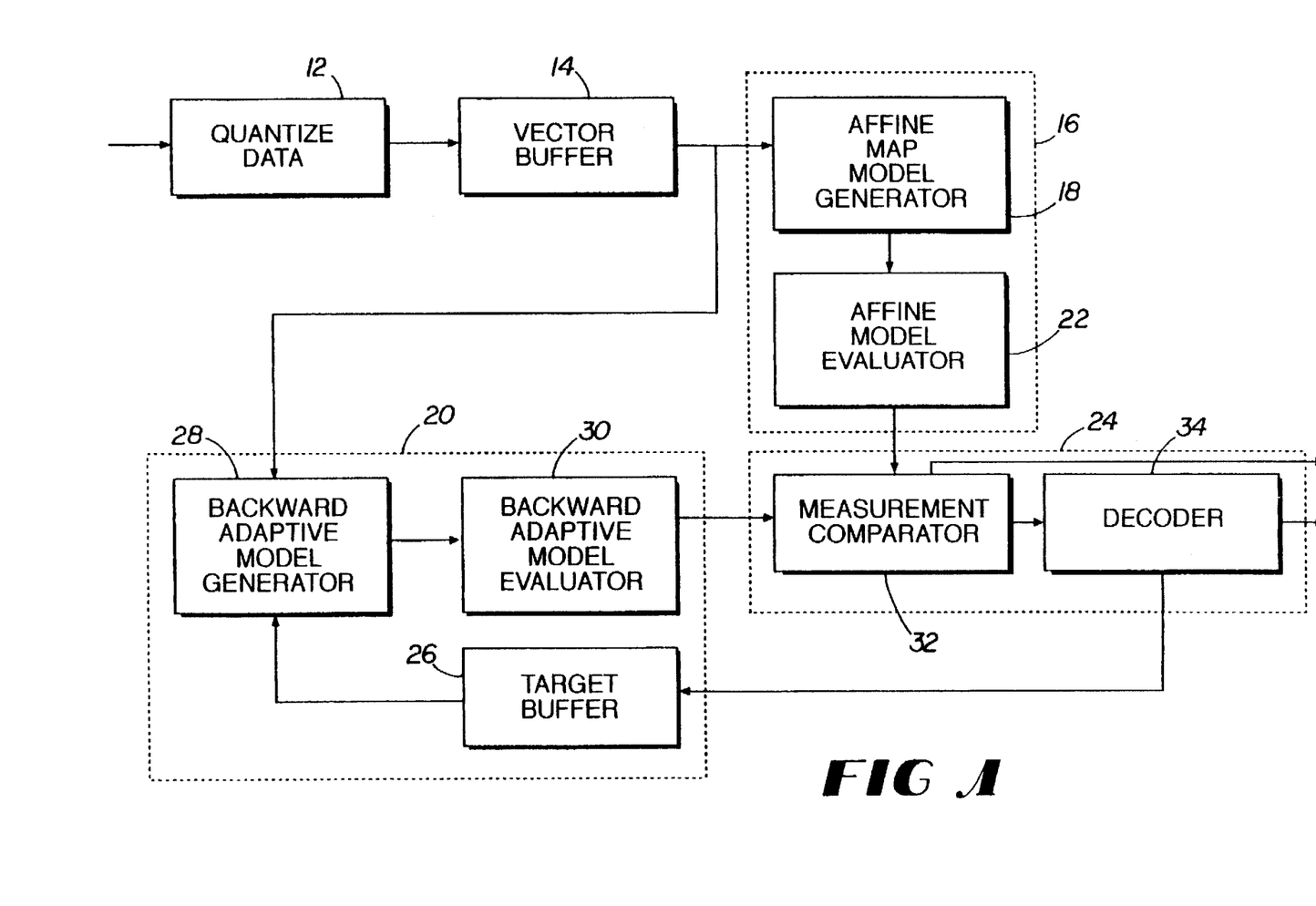
FIG. 1 is a block diagram of an encoder implementing the fractal modeling method of the present invention.

A block diagram of an encoder 10 incorporating the principles of the present invention is shown in FIG. 1. The system includes a vector buffer 14, a self-affine map generator 16, a backward adaptive map generator 20, and a map selector 24. Self-affine map generator 16 uses known geometric or analytical fractal modeling methods to generate a set of map coefficients for a mapping function which represents a source vector contained within vector buffer 14. The backward adaptive map evaluator 20 of encoder 10 uses a modified fractal modeling technique to generate mapping functions which are evaluated so a best mapping function is selected from those generated by generator 20. Map selector 24 compares measurements corresponding to the mapping functions generated by map generators 16 and 20 to select a best mapping function for representing the source vector. Preferably, the selected mapping function has an affine map form and the coefficients for the function are encoded and sent to a decoder at a remote location.

The input to encoder 10 is typically digitized or telephone sound data which is preferably pulse code modulated (PCM) to generate discrete data. The sound data is typically provided at a rate of 64 kilobits per second (KBPS) in a companded PCM code. These codes are well known in the art and are typically referred to as A-law or µ-law encoding. Because these encoded functions exhibit logarithmic behavior, they must be converted to a uniform pulse code modulated form before they are compressed by encoder 10. The PCM conversion preferably quantizes the data samples as 16 bit values, although other sample sizes may be used. Preferably, vector buffer 14 holds twelve samples to form a source vector. This preferred sample size may be processed by encoder 10 with relatively low delay in sending the encoded signal value through to the decoder. This low delay is preferred in voice data applications such as sound track data for video frames or telephone communication. For such applications, the source vector may be up to approximately 20 samples in length for 16-bit values for transmission rates of approximately 64 KBPS before the delay in processing the source vector affects the transmission rate of the encoded data.

Self-affine map generator 16 preferably divides the source vector in vector buffer 14 into domain ranges by selecting the midpoint of the buffer to form first and second domain vectors, although other numbers of domains may be generated from a source vector. Range vectors are then selected from the vector buffer that are at least the same size as the domain vectors in length, although the range vectors may overlap. These domain and range vectors are used by self-affine map generator 16 to determine the parameters for a number of mapping functions. Generator 16 includes an affine map model generator 18 and an affine model evaluator 22. The affine model generator 18 preferably uses known analytical or geometric fractal modeling techniques to compute a contractive factor and coefficients for a mapping function which best map one or more of the range vectors to one of the domain vectors. The affine model evaluator 22 applies each mapping function to the source vector once to generate a comparison vector. To determine how closely the mapping function represents the source vector, a difference measurement between each comparison vector and source vector is computed. Preferably, the difference measurement is calculated by computing a weighted meansquared difference between the vectors. One commonly used weighted error measurement uses weighting factors which are the inverse of the covariance matrix of a random vector x. The error measurement calculated using this weighting factor matrix is commonly known as the Mahalanobis distance. For human voice data a perceptually motivated distortion measure is preferably used. A number of these perceptually motivated distortion measures are disclosed in VECTOR QUANTIZATION IN SPEECH CODING, Proceedings of the IEEE, Vol. 73, No. 11, November 1985. Such measurements provide error criteria which may be optimized to identify mapping functions that best represent data for the human ear. However, other known error measurements may be used to compute the difference such as Euclidean distance measure ($L_2$), distance measure ($L_1$), Hausdorff distance measure, or other known distance error measurements. The difference measurement is, preferably, multiplied by $1/1-s$ where s is the interpolated contractive factor for the mapping function to compute the collage error which represents the upper bound of the mapping function error. The mapping function corresponding to the smallest collage error is selected.

Backward adaptive map generator 20 includes a target buffer 26, backward adaptive model generator 28 a backward adaptive model evaluator 30. The target buffer 26 of backward adaptive map evaluator 20 is preferably initialized with values generated by a random number generator, although other data patterns, such a voice track models, may be used to initialize the target buffer 26. Preferably, target buffer 26 has storage for 768 16-bit digital values. When a source vector is available in vector buffer 14, backward adaptive model generator 28 retrieves a target vector from target buffer 26 which preferably is comprised of the same number of samples as the source vector. A modified fractal modeling technique is used to compute mapping coefficients for mapping the retrieved target vector to the source vector. The modified technique is the same as those taught in *USING ITERATED FUNCTION SYSTEMS TO MODEL DISCRETE DATA SYSTEMS* discussed above except the modified technique does not require that the computed contractive factor be in the range of −1 to +1. This condition is required for the fractal techniques discussed above because the deterministic and random iteration processes used to decompress data had to converge to an attractor. Such convergence is not possible without the contractivity factor being in the −1 to +1 range. Because the backward adaptive map evaluator 20 applies the computed map to the target vector only once there is no need for convergent criteria to stop the inverse process. As a result, the backward adaptive map evaluator of the present invention permits maps to be evaluated which are not evaluated by the self-affine map generator 16.

Preferably, backward adaptive model generator 28 uses a sliding window to group the samples in the target buffer into target vectors for retrieval. Thus, in the preferred embodiment, mapping functions for 757 target vectors are determined and a difference measurement corresponding to each mapping function is computed.

Backward adaptive model evaluator 30 computes the difference measurement by calculating a weighted mean-squared value of the difference between the source vector and the comparison vector formed by applying the mapping function to the target vector once. For human speech data, the perceptually weighted measurement is preferably used, although any of the measurements discussed above with respect to the self-affine map generator 16 may be used. The mapping function which corresponds to the smallest difference measurement is provided by the backward adaptive model evaluator 30 to the map selector 24.

Map selector 24 includes a measurement comparator 30 and a decoder 34. Map selector 24 is coupled to self-affine map generator 16 and backward adaptive map generator 20 to receive the mapping function selected by the respective generators and the corresponding measurements. Measurement comparator 32 compares the collage error for the mapping function from self-affine map generator 16 to the difference measurement for the backward adaptive map generator 20 and selects the mapping function corresponding to the smallest measurement. The coefficients of the selected mapping function are then encoded for transmission along with a token which indicates whether the codes are from self-affine map generator 16 or from backward adaptive map generator 20. Preferably, the token is a one bit flag, the state of which indicates whether the encoded coefficients are from the self-affine map generator or the backward adaptive map generator. If the map is from backward adaptive map evaluator 20, the synthesized vector used to generate the map is identified. Preferably, this identification is the address of the first sample of the target vector used to determine the parameters of the mapping function. The synthesized vector identifier is then encoded with the other data for transmission to a receiver.

If the mapping function of self-affine generator 16 is selected, the mapping function is provided to decoder 34 which uses an iterated algorithm to generate a synthesized vector. Otherwise, the comparison vector generated by backward adaptive map generator 20 is provided to map selector 24 as the synthesized vector. The synthesized vector is stored in the target buffer 26 for use by the backward adaptive map generator 20.

Decoder 34 provides map selector 24 with the capability of generating the synthesized vector corresponding to the mapping function from generator 16. In an alternative embodiment, measurement comparator 30 may generate a signal in response to the comparison being equal to or less than a predetermined threshold which indicates the comparison is close. To more accurately determine which mapping function to select, the mapping function from self-affine map generator 16 is provided to decoder 34 which generates the synthesized vector corresponding to the mapping function from generator 16. A difference measurement between the synthesized vector and the source vector may then be computed using any of the measurements previously discussed above. This difference may then be compared to the difference measurement for the mapping function from the backward adaptive map generator 20 to select the mapping function that best represents the source vector. Such a comparison requires significantly more computing time and resources to implement but may be used in applications where such resources are available or where the collage error/difference measurement is within a predetermined range which requires more accurate measurements for evaluation.

Figure 2:
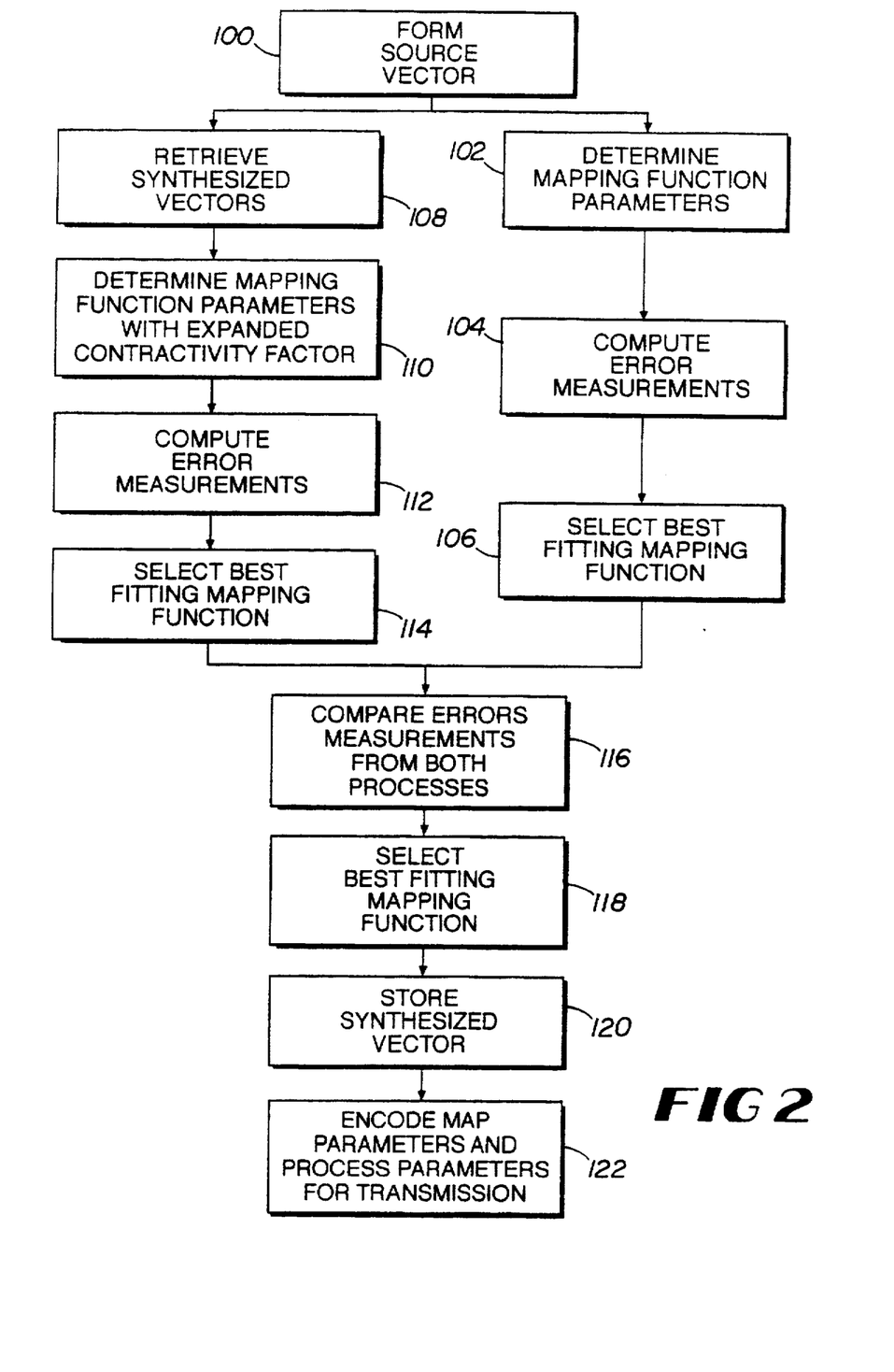
FIG. 2 is a flowchart of the process implemented by the encoder of the present invention.

The process implemented by the encoder of the present invention is shown in FIG. 2. The process begins by forming a source vector from the discrete data sequence being input to the encoder (Block 100). The process continues by, preferably, performing the self-affine map generation process steps (Blocks 102–106) in parallel with the backward adaptive map generating steps (Blocks 108–114, however, these processes may be performed serially. The self-affine map generating steps include the determination of mapping function parameters which map range blocks of the source vector to domain blocks of the source vector (Block 102). Any of the known fractal modeling techniques may be used to determine function parameters for the various domains and ranges selected from the source vector. For each of the mapping functions, error measurements are computed (Block 104), which are preferably collage error measurements. These error measurements are compared to determine which measurement is the smallest. The mapping function corresponding to the smallest error measurement is selected as the one which best represents the source vector (Block 106).

The backward adaptive process begins by retrieving a synthesized vector previously generated to represent a source vector (Block 108). The mapping function parameters are then determined using known fractal modeling techniques which are modified by permitting the mapping functions to include those functions with a contractivity factor having an absolute value which is greater than 1 (Block 110). The error measurements for each of the mapping functions are then computed (Block 112) and the mapping function corresponding to the smallest error measurement is selected as the one best representing the source vector (Block 114). The mapping functions and error measurements from both processes are then compared so the mapping function which best represents the source vector may be selected (Block 116). If the mapping function from the backward adaptive process is selected (Block 118), the comparison vector computed as part of the error measurement process is stored as the synthesized vector in the target buffer of the backward adaptive map generator 20 (Block 120). If the mapping function is from a self-affine process, the mapping function is provided to a decoder 32 which iteratively applies the mapping function to a data buffer to generate a synthesized vector for storage in the target buffer (Block 120). Finally, the map parameters and process parameters, including identification of the process which generated the parameters for the mapping function and identification of the first sample of the target vector used to generate the mapping parameters, if the backward adaptive process was used, are then encoded for transmission (Block 122).

Figure 3:
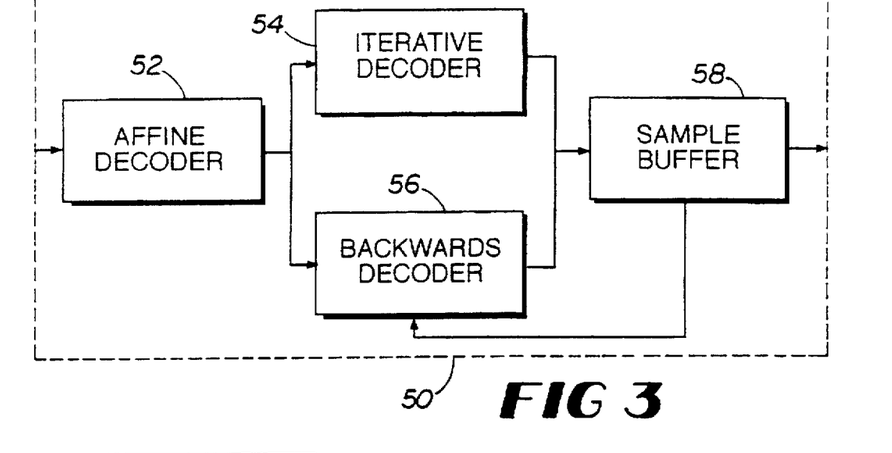
FIG. 3 is a block diagram of a decoder implementing the fractal modeling method of the present invention.

The decoder 50 of the present invention is shown in FIG. 3. That decoder includes affine map decoder 52, iterative decoder 54, backward decoder 56, and decode buffer 58. The decoder 50 implements iterative decompression methods and a backward adaptive decompression method. Specifically, the affine map decoder 52 unpacks the map codes for the mapping function and the source token. Using the token, decoder 52 determines whether the codes are from the self-affine map generator 16 or backward adaptive map generator 20. If the codes are from the self-affine map generator 16, the map coefficients are provided to iterative decoder 54 which iteratively applies the map codes to a randomly initialized buffer using a deterministic or random iterative method until the convergence criteria are reached and a synthesized vector is generated. The synthesized vector is stored in decode buffer 58 and output for conversion so a device at the receiver may use the decoded signal. If the map coefficients are from backward adaptive map evaluator 20, the vector identifier transmitted with the coefficients is used to identify a synthesized vector in decode buffer 58. Because decode buffer 58 and target vector buffer 26 contain the same data, the identifier provides backward decoder 56 with the vector first sample address for the samples comprising the target vector used to determine the map parameters for the mapping function. The vector corresponding to the coefficients is returned from decode buffer 58 and backward decoder 56 applies the mapping function to the retrieved vector once to generate the next synthesized vector. The synthesized vector is placed in the decode buffer 58 and output for use at the receiver. Because the backward decoder 56 only applies the mapping function once, the generation of the synthesized vector requires less computer resources and processing time than the iterative process performed by iterative decoder 54. Thus, if the source vector data being represented by encoder 10 is redundant, backward adaptive map generator 20 and backward decoder 56 are frequently used for the encoding and decoding and the compression and decompression times for the source data are significantly reduced over known discrete data methods.

Figure 4:
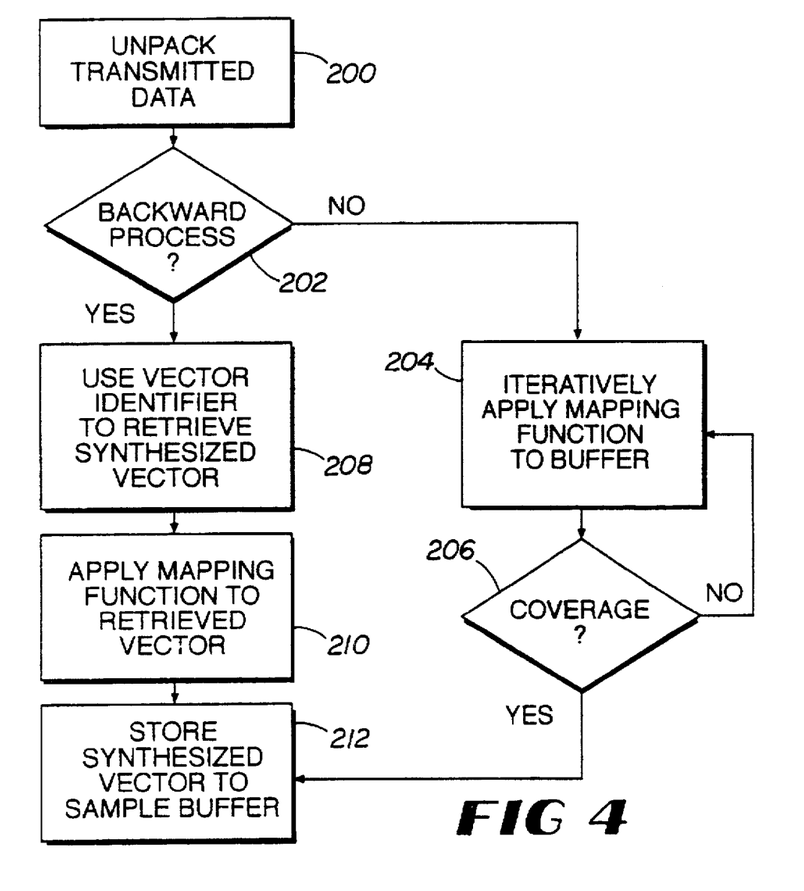
FIG. 4 is a flowchart of the process implemented by the decoder of the present invention.

The process implemented by the decoder of the present invention is shown in FIG. 4. The process begins by unpacking transmitted data from the data message format in which it was transmitted to identify the elements within the transmitted data message (Block 200). The token for identifying the process used to generate the mapping function is then parsed to determine whether the mapping function is from the backward adaptive process or the self-affine process (Block 202). If the mapping function is from the self-affine mapping process, a data buffer is initialized and the mapping function iteratively applied (Block 204) until the convergence criteria are met (Block 206). Once the convergence criteria are met, the resulting synthesized vector in the data buffer is stored in the sample buffer for use at the receiver (Block 212). If the process token identifies the backward adaptive process as generating the mapping function, the vector identifier is used to retrieve a synthesized vector from the sample buffer (Block 208). Specifically, the first sample address is used to retrieve the first sample and the samples following that first sample to form the synthesized vector. The number of samples retrieved from the sample vector corresponds to the number of samples used to form the source vector in the encoding process. The mapping function is then applied once to the retrieved synthesized vector (Block 210) and the resulting synthesized vector is stored to the sample buffer.

The encoder and decoder components may be implemented on a personal computer or the like using a 80286 processor with a math coprocessor or better having at least 8 megabytes of RAM and 100 megabytes of hard disk drive storage available. The programs implementing the backward adaptive map generator, the self-affine map generator, and the map selector of the encoder are preferably written in the C language. The affine decoder, iterative decoder, and backward decoder of the decoder are preferably written in the C programming language as well. While the system is preferably implemented on a personal computer to make modification of the programs easier, the processes of the present invention may be implemented in a digital signal processing integrated circuit.

In use, a data source generating a sequence of discrete data samples is coupled to a uniform PCM converter or the like to quantize the data samples for storage in vector buffer 14. Once enough samples have been collected to form a source vector, self-affine map generator 16 segments the source vector into domain and range vectors, determines the parameters of the mapping functions, and computes collage errors between the source vector and the comparison vectors corresponding to the mapping functions. The mapping function corresponding to the smallest collage error is selected as the mapping function to be evaluated by map selector 24. Backward adaptive map evaluator 20 retrieves target vectors from target vector buffer 26, determines the parameters of a mapping function for each target vector, and computes a difference measurement between a comparison vector corresponding to each target vector and the source vector. The mapping function, difference measurement, and comparison vector corresponding to the smallest difference measurement are provided to map selector 24 as are the mapping function and collage error measurement from self-affine map generator 16. Map selector 24 selects the mapping function corresponding to the smallest difference or collage error measurement. The source of the mapping function is identified and, if the function was generated by backward adaptive map generator 20, the target vector is also identified. The map, source token, and vector identifier, if necessary, are encoded and transmitted to a receiver. If the mapping function is generated by self-affine map generator 16, decoder 32 in map evaluator 24 iteratively uses the mapping function to generate a synthesized vector. The synthesized vector or comparison vector, depending on the mapping function selected, is stored in the target vector buffer 26 as the synthesized vector which best represents the source vector. The process continues as long as discrete data is being input to encoder 10 so source vectors may be formed in buffer 14.

At the decoder, the map coefficients and tokens are decoded and the source of the mapping function is determined. If the map is from self-affine map generator 16, iterative decoder 54 uses a deterministic or random iterative method to generate a synthesized vector which is stored in the sample buffer 58 and used by a device coupled to the decoder. If the map is from backward adaptive map generator 20, backward decoder 56 retrieves a vector corresponding to the identified target vector from sample buffer 58, applies the mapping function to the retrieved vector once, and stores the resulting synthesized vector in the sample buffer 58.

While the present invention has been illustrated by the description of a preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art. For example, the perceptually weighted error measurements may be used with other modeling methods, such as DCT, wavelet or the like, to better select functions to represent a data set. Another example is the use of a backward adaptive target vector buffer to store synthesized vectors which may be used with other modeling methods to provide vectors for determining functions to represent the source vector. The invention in its broadest aspects is therefore not limited to the specific details, preferred embodiment, and illustrative examples shown and described. Accordingly, departures may be made from such details without departing from the spirit or scope of applicant's general inventive concept.

What is claimed is:

1. An encoder for a discrete data sequence comprising:
    a self-affine map generator for generating a first mapping function which maps a first source vector in a data sequence to a portion of itself;
    a backward adaptive map generator for generating a second mapping function which maps a target vector to said first source vector, said target vector being formed from vectors previously generated to represent other source vectors which preceded said first source vector; and
    a map selector for selecting one of said first and second mapping functions for representing said first source vector.

2. The encoder of claim 1, said backward adaptive map generator further comprising:
    a target vector buffer for storing said previously generated vectors, said backward adaptive map generator selecting target vectors from said vectors stored in said target vector buffer for generating said second mapping function.

3. The encoder of claim 2, said backward adaptive map generator further comprising:
    a backward adaptive model generator for determining map parameters for a mapping function for each said selected target vector by mapping each said selected target vector to said first source vector; and
    a backward adaptive model evaluator for generating a comparison vector by applying each said mapping function determined for each said target vector to its corresponding said target vector, said model evaluator computing a difference measurement between said first source vector and each said comparison vector so that said second mapping function corresponds to said generated comparison vector for which a smallest difference measurement was computed.

4. The encoder of claim 3 wherein said backward adaptive model generator determines map parameters for mapping functions having a contractive factor with an absolute value equal to or greater than one.

5. The encoder of claim 2 wherein said backward adaptive map generator selects target vectors from said previously generated vectors stored in said target vector buffer with a sliding window.

6. The encoder of claim 2 wherein said difference measurement is a weighted mean squared measurement.

7. The encoder of claim 2 wherein said map selector generates a token for identifying a source of said selected mapping function as one of said self-affine map generators and said backward adaptive map generator and a target vector identifier in response to said identified source being said backward adaptive map generator.

8. The encoder of claim 2 wherein said difference measurement is a perceptually weighted measurement.

9. A decoder for a discrete data sequence comprising:
    a iterative decoder for iteratively applying a mapping function generated by a self-affine map generator to generate a synthesized vector;
    a backward decoder for applying a mapping function generated by a backward adaptive map generator to a previously generated synthesized vector retrieved from a sample buffer to generate a second synthesized vector; and
    a self-affine decoder for selecting one of said iterative and said backward decoders in response to a token indicating a source of said mapping function.

10. The decoder of claim 9 said decoder further comprising:
    a sample buffer for storing said previously generated synthesized vectors, said backward decoder selecting samples comprising a vector from said sample buffer in correspondence with a vector identifier.

11. The decoder of claim 10 wherein said backward decoder applies said mapping function once to said vector selected from said samples of said previously generated synthesized vectors stored in said sample buffer to generate said second synthesized vector.

12. A method for encoding discrete data comprising the steps of:
    forming a source vector from a discrete data sequence;
    retrieving a plurality of target vectors from a plurality of previously generated vectors stored in a target vector buffer;
    determining map parameters for a plurality of mapping functions which maps each said target vector to said source vector;
    computing a comparison vector for each determined mapping function and said corresponding target vector;
    computing a distance measurement between each said comparison vector and said source vector; and
    selecting a mapping function that best represents said source vector, said selected mapping function corresponding to a smallest distance measurement.

13. The method of claim 12, further comprising the steps of:
    determining map parameters for a plurality of mapping functions which map ranges of said source vector to domains of said source vector;
    computing a collage error for each mapping function;
    selecting a mapping function that best represents said source vector, said selected mapping function corresponding to a smallest collage error; and
    selecting one of said mapping functions that corresponds to said smallest collage error and said mapping function corresponding to said smallest distance measurement such that said selected mapping function corresponds to said smaller of the two measurements.

14. The method of claim 12, further comprising the steps of:

computing said comparison vector by applying said mapping function to said corresponding target vector once.

15. The method of claim 12, wherein said computing distance measurement step computes a weighted mean squared measurement.

16. The method of claim 12, wherein said computing distance measurement step computes said distance measurement as a perceptually weighted measurement.

17. A system for representing a discrete data sequence comprising:

a quantizer for receiving and quantizing a sequence of discrete data samples;

a vector buffer for storage of said quantized data samples, said vector buffer storing a predefined number of samples to form a source vector;

a target buffer for storage of previously generated vectors which represent other source vectors;

a backward adaptive model generator for generating and applying a mapping function to target vectors retrieved from said target buffer to generate comparison vectors; and a backward adaptive map evaluator for measuring an error between each of said comparison vectors and said source vector, said backward adaptive map evaluator selecting said mapping function and corresponding target vector having a smallest measured error whereby said selected mapping function and said target vector may be used to represent said source vector.

18. The system of claim 17 further comprising:

a self-affine map generator for generating a mapping function which maps a source vector to a portion of itself; and a map selector for measuring a collage error corresponding to a representation of said source vector by said mapping function generated by said self-affine map generator, said map selector selecting one of said mapping functions generated by said backward adaptive model generator and said mapping function generated by said self-affine map generator, said selected mapping function corresponding to a smallest error measured by said map selector and said backward adaptive model generator.

19. a decoder for generating a synthesized vector and storing said synthesized vector in said target buffer in response to said map selector selecting said mapping function generated by said self-affine map generator, said decoder storing said comparison vector in said target buffer in response to said map selector selecting said mapping function generated by said backward adaptive model generator.

20. The system of claim 19 wherein said map selector generates a token which identifies said selected mapping function as being generated by one of said backward adaptive model generators and said self-affine map generator.

21. The system of claim 19 wherein said decoder generates said synthesized vector using an iterative method.

22. The system of claim 19 wherein said decoder generates said synthesized vector using a deterministic method.

23. The system of claim 17 wherein said discrete data source provides audio data samples.

24. The system of claim 23 wherein said audio data samples are one of A-law and μ-law encoded samples.

25. The system of claim 24 wherein said quantizer generates pulse code modulated (PCM) data.

26. The system of claim 25 wherein said PCM data are sixteen (16) bit samples.

27. The system of claim 17 wherein said vector buffer holds twelve quantized samples for a discrete data sequence of approximately sixty-four (64) kilobits per second (KPS) so that said map selector selects said mapping function to represent said source vector with low delay.

28. The system of claim 17 wherein said source buffer holds up to twenty (20) samples of audio data for a discrete data sequence of approximately 64 KPS.

29. The system of claim 28 wherein said measured error is a perceptually motivated distortion measurement.

30. The system of claim 17 wherein said target buffer has a storage capacity corresponding to a multiple of said source vector.

31. The system of claim 30 wherein said target buffer has a storage capacity corresponding to seven hundred and sixty-eight (768) source vectors.

32. The system of claim 17 wherein said backward adaptive model generator selects said target vector from said target buffer using a sliding window.

33. The system of claim 32 wherein said sliding window corresponds to said source vector length.

34. The system of claim 17 wherein said backward adaptive model generator generates non-contractive mapping functions.

35. The system of claim 17 wherein said measured error is a weighted error distance.

36. The system of claim 35 wherein said weighted error distance is a Mahalanobis distance.

* * * * *